Feb. 20, 1923. 1,446,321
A. C. ROWLEY
DRY PIPE VALVE
Filed July 26, 1921 4 sheets-sheet 1

Inventor-
Arthur C. Rowley.
by his Attorneys
Howson & Howson

Feb. 20, 1923.

A. C. ROWLEY 1,446,321

DRY PIPE VALVE

Filed July 26, 1921    4 sheets-sheet 4

Fig. 4.

Inventor—
Arthur C. Rowley.
by his Attorneys
Howson & Howson

Patented Feb. 20, 1923.

1,446,321

UNITED STATES PATENT OFFICE.

ARTHUR C. ROWLEY, OF PHILADELPHIA, PENNSYLVANIA, ASSIGNOR TO GLOBE AUTOMATIC SPRINKLER COMPANY, OF PHILADELPHIA, PENNSYLVANIA, A CORPORATION OF PENNSYLVANIA.

DRY PIPE VALVE.

Application filed July 26, 1921. Serial No. 487,618.

*To all whom it may concern:*

Be it known that I, ARTHUR C. ROWLEY, a citizen of the United States, residing in Philadelphia, Pennsylvania, have invented Dry Pipe Valves, of which the following is a specification.

In dry pipe valves such as are commonly employed in connection with automatic sprinkler systems, it has been found that after the water valve or clapper has opened under operating conditions, the passage of water through the valve casing has set up side currents which in some instances have acted to cause closing of said water clapper and a consequent cutting off of the water flow.

One object of the present invention therefore is to provide a dry pipe valve with novel means for positively locking its water valve or clapper in the open position after it has once been moved thereto so that it shall be impossible for a subsequent flow of water through the valve casing to cause it to close.

It is further desired to provide a novel mounting for the water-clapper-engaging latch of a dry pipe valve which shall prevent accidental release of the clapper and require forcible manual operation before it can be freed from said clapper so as to permit closing thereof.

I also desire to provide a novel form of dry pipe valve which shall include a clapper-controlled drainage valve, together with a latch operatively associated with said drainage valve for holding the water clapper in its open position after it has been moved thereto;—the arrangement of parts being such as to require manual tripping or opening of the drainage valve before the latch can be so operated as to release the water valve, thus avoiding the possibility of the latch being disengaged from the water clapper by the violent flow of water through the valve.

Figure 1:
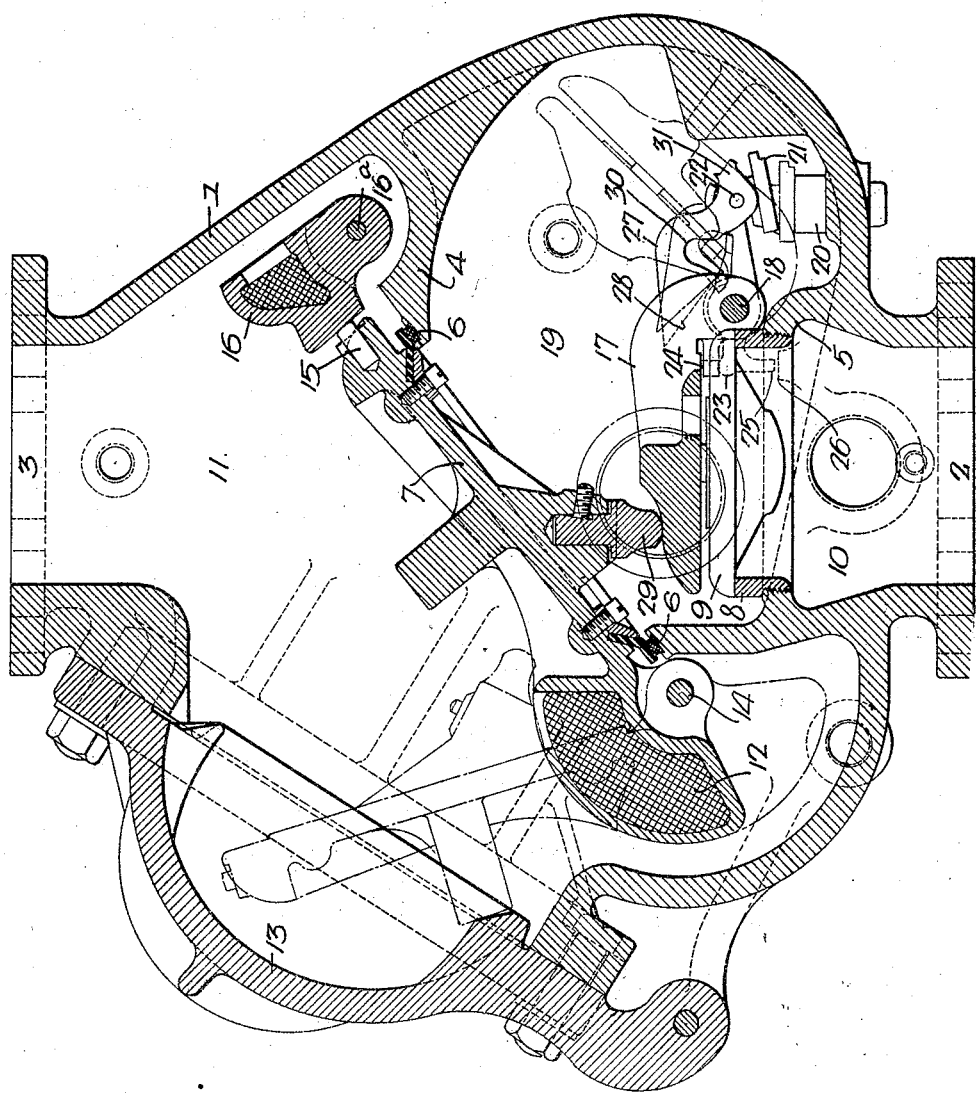
Figure 2:
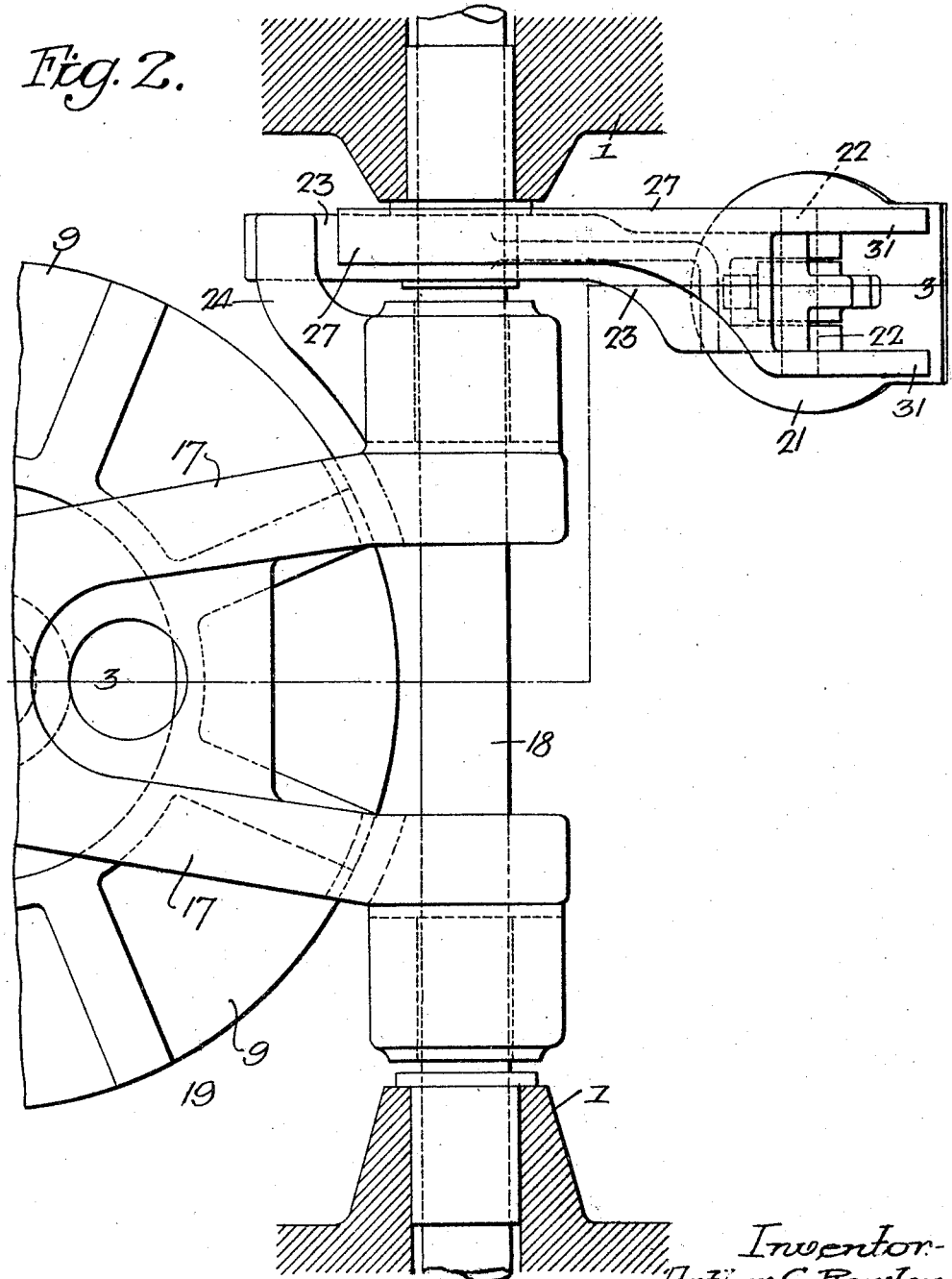
Figure 3:
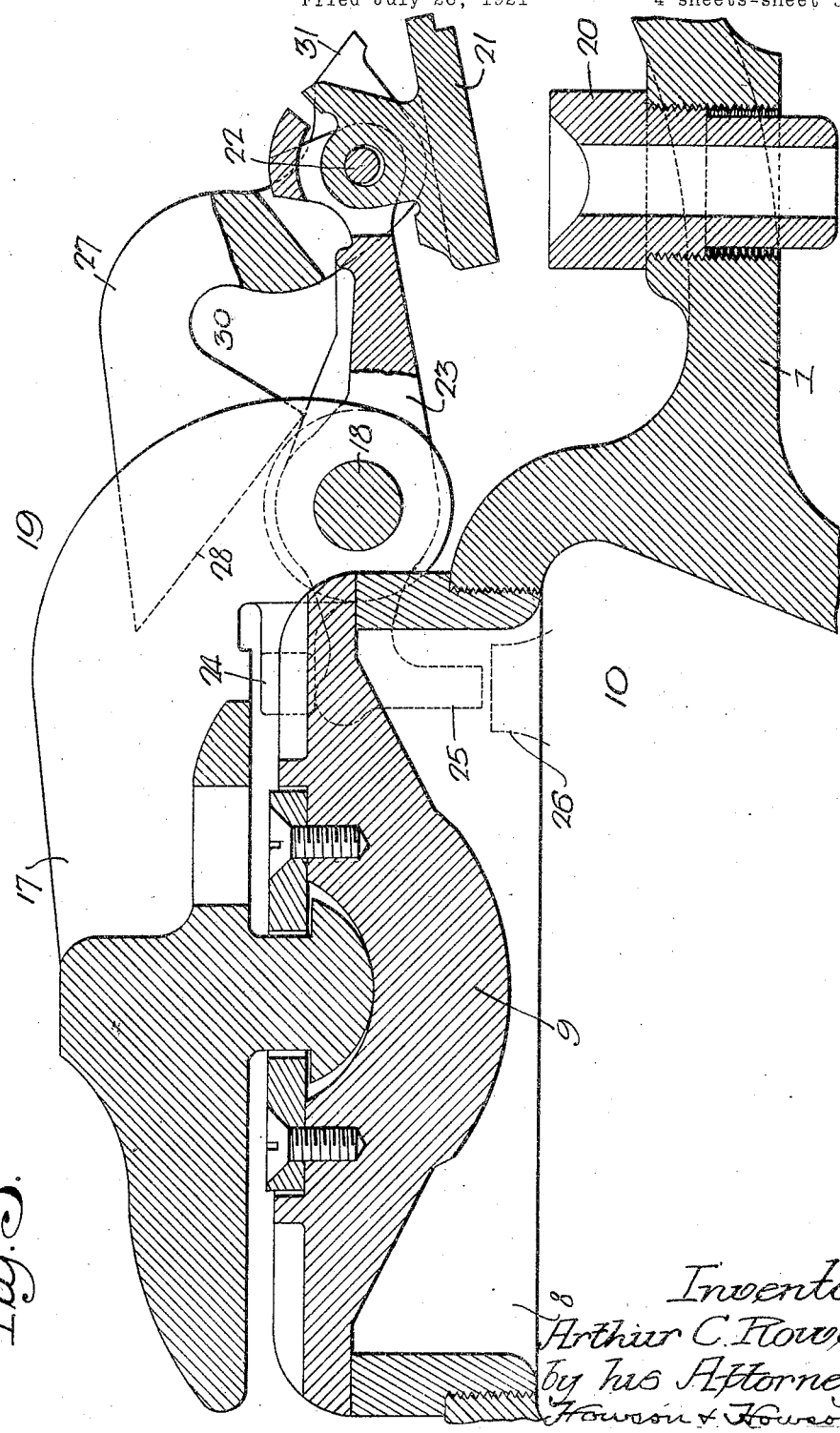

These objects and other advantageous ends I attain as hereinafter set forth, reference being had to the accompanying drawings, in which, Fig. 1 is a longitudinal vertical section of a dry pipe valve constructed in accordance with my invention;

Fig. 2 is a plan partly in section and on a larger scale than Fig. 1, illustrating the detail construction and mounting for the water clapper and drainage valve with their associated parts; and Figs. 3 and 4 are vertical sections on the line 3—3, Fig. 3, illustrating a water clapper and its associated parts in the positions respectively occupied when it is closed and open.

In the above drawings, 1 represents the casing of a dry pipe valve having a water inlet 2, an outlet 3, and two transverse partitions 4 and 5. Through the first of these partitions is a circular opening axially in line with the inlet and outlet and inclined in a plane at an angle thereto, having a seat 6 for coaction with an air clapper or valve 7. The partition 5 also has an opening in which is mounted a valve seat 8 for coaction with a water clapper 9.

Under conditions of use the chamber 10 leading from the inlet 2 is connected thereby to a water supply conduit, while the chamber 11 having the outlet 3 is connected to the sprinkler system which normally contains air under a predetermined pressure. The air clapper 7 has a counterweight 12 tending to unseat and swing it into the position indicated in dotted lines in Fig. 1 and the casing adjacent said clapper has a side opening normally closed by a cover plate 13 made inwardly concave to receive the clapper when in its open position as well as to limit its movement. Said clapper is mounted to swing on a pivot spindle 14 in the air chamber 11 and opposite said spindle has a pin 15 set in position to cooperate with a weighted latch 16 which at all times tends to swing on its pivot 16$^a$ so as to prevent reseating of the air clapper after it has once moved a predetermined distance off its seat 6.

The water clapper 9 is connected more or less loosely by a ball and socket joint to a forked yoke 17 whose branches are mounted on a pivot spindle 18 extending transversely of the casing 1 within the chamber 19 between the two partitions 4 and 5. This chamber is normally connected to the atmosphere through a valve seat 20 mounted in its lower part and cooperating with a drainage valve 21 loosely hung from a pivot spindle 22 carried by the branches of a forked arm 23 rotatably mounted on the clapper spindle 18. The opposite end of said arm is extended beyond said latter spindle to cooperate with a finger 24 laterally projecting from one of the branches of the yoke 17.

The arrangement is such that when the water clapper 9 is closed and in engagement with its seat, this finger engages the extension of the arm 23, holding it in such position that the drainage valve 21 is held out of engagement with and above its seat 20. Said arm extension is extended downwardly as indicated in dotted lines at 25 and is designed to cooperate with an abutment 26 provided by a portion of the casing structure, to limit its downward movement.

Also journaled on the pivot spindle 22 of the drainage valve is a hooked latch 27 extended toward the water clapper and having the under edge 28 of its free end inclined to cooperate with the finger 24 when the water clapper moves toward its open position.

The under face of the air clapper 7 is formed with a downwardly projecting stud 29 designed to cooperate with the forward end of the yoke 17 so that when the clappers are closed, air under a predetermined pressure in the chamber 11 will act through the air clapper and the stud 29 upon the yoke 17 to hold the water clapper closed against the relatively higher water pressure in the chamber 10.

With the parts in the positions shown in Fig. 1, the drainage valve 21 is held open so that the chamber 19 is at atmospheric pressure. If now one or more of the sprinkler heads of the system connected to the outlet 3 should open, the resulting reduction of air pressure in the chamber 11 will permit the pressure of the water acting on the clapper 9 to unseat it, so that it and the air clapper 7 will move to the open positions indicated in dotted lines in Fig. 1. Since the movement of the water clapper toward the position shown in Fig. 4 will cause the finger 24 to disengage the arm 23, the drainage valve 21, under the action of gravity, will swing downwardly as said arm turns on the pivot spindle 18 into engagement with its seat 20 as shown in Fig. 4. Thereafter said finger will engage the inclined face 28 of the end of the latch 27, raising it and finally entering its recess 30, after which said latch falls into the position shown in Fig. 4.

Water is now free to pass from the inlet 2 of the casing straight through the same to its outlet and even though it should swirl and set up eddy currents acting upon the water clapper 9, the latter is none the less effectually held by the latch in its open position. Said water currents cannot raise the latch to free the finger 24 since said latch has a projection 31 designed to cooperate with the drainage valve 21 in such manner that it is necessary to unseat the latter or move it into its open position before said latch can be disengaged from said finger. The force of the water currents passing through the valve casing is not sufficient to raise the latch and also unseat the drainage valve 21, so that the water clapper is held open until after the flow of water has been cut off. The latch 27 may then be manually disengaged from the finger 24 of the water clapper and the valve 21 unseated, after which the various parts of the device may be restored to their normal positions. The drainage valve 21 being normally open, permits the escape of any liquid which may leak into the chamber 19 and maintains it at atmospheric pressure.

From the above description it will be noted that after having once been moved to its fully open position, the water clapper is positively held or locked therein by the latch. Moreover the drainage valve is held upon by the water clapper until such time as the latter opens, when it is released and permitted to seat not only by its own weight but by reason of the added weight of the arm 23 and latch 27.

I claim:

1. The combination in a dry pipe valve of a water clapper; a drainage valve; a member carrying said drainage valve and normally retained by the water clapper in position to hold the drainage valve open; and a latch also carried by said member for holding the water clapper in its fully open position after it has been moved thereto.

2. The combination in a dry pipe valve of a casing having water, air and atmospheric chambers; air and water clappers in the casing; a drainage valve for the atmospheric chamber normally held open by the water clapper; and a latch operatively associated with said drainage valve for positively holding the water clapper in its full open position after it has moved thereto.

3. The combination in a dry pipe valve of a casing; a water clapper and a drainage valve therein; and a latch for holding the water clapper fully open, mounted to require opening of the drainage valve before it can be moved to a clapper-releasing position.

4. The combination in a dry pipe valve of a casing; a water clapper; a spindle for rotatably connecting the water clapper to the casing; an arm mounted on the spindle and normally held in a predetermined position by the clapper as long as the latter is closed; a drainage valve carried by said arm; and a latch also mounted on the arm in position to hold the clapper open after it has been moved to its open position.

5. The combination in a dry pipe valve of a casing; a water clapper; a spindle for rotatably connecting the water clapper to the casing; an arm mounted on the spindle and normally held in a predetermined position by the clapper as long as the latter is closed; a drainage valve carried by said arm; with a latch also mounted on the arm in position to hold the clapper open after it has been moved to its open position and formed to cause opening of the drainage valve before it can be moved to a clapper-releasing position.

6. The combination in a dry pipe valve of a water clapper having a projecting member; a lever having an arm in position to cooperate with said member; a valve carried by said lever and held in its open position thereby by the engagement of the arm by the projecting member of the water clapper when the latter is closed; and a latch carried by said lever for holding the water clapper open.

7. The combination in a dry pipe valve of a casing; a water clapper therein; a spindle rotatably connecting said clapper to the casing; an arm connected to and movable with the water clapper; a drainage valve for the casing; a lever engaging said drainage valve and mounted on the spindle in position to be engaged by said arm of the water clapper to hold the drainage valve open when the water clapper is closed; and a latch also carried by the lever in position to engage said arm of the water clapper to hold the latter in its open position after it has been moved thereto.

8. The combination in a dry pipe valve of a water clapper; a latch for holding said clapper in its full open position after it has been moved thereto; and a drainage valve associated with said latch so as to be necessarily opened when the latch is moved to its clapper-releasing position.

9. The combination in a dry pipe valve of a water clapper; a latch for holding said clapper in its open position after it has been moved thereto; a drainage valve associated with said latch so as to be necessarily opened when the latch is moved to its clapper-releasing position; with a member controlled by the water clapper for supporting both the drainage valve and said latch.

ARTHUR C. ROWLEY.